Figure 1:
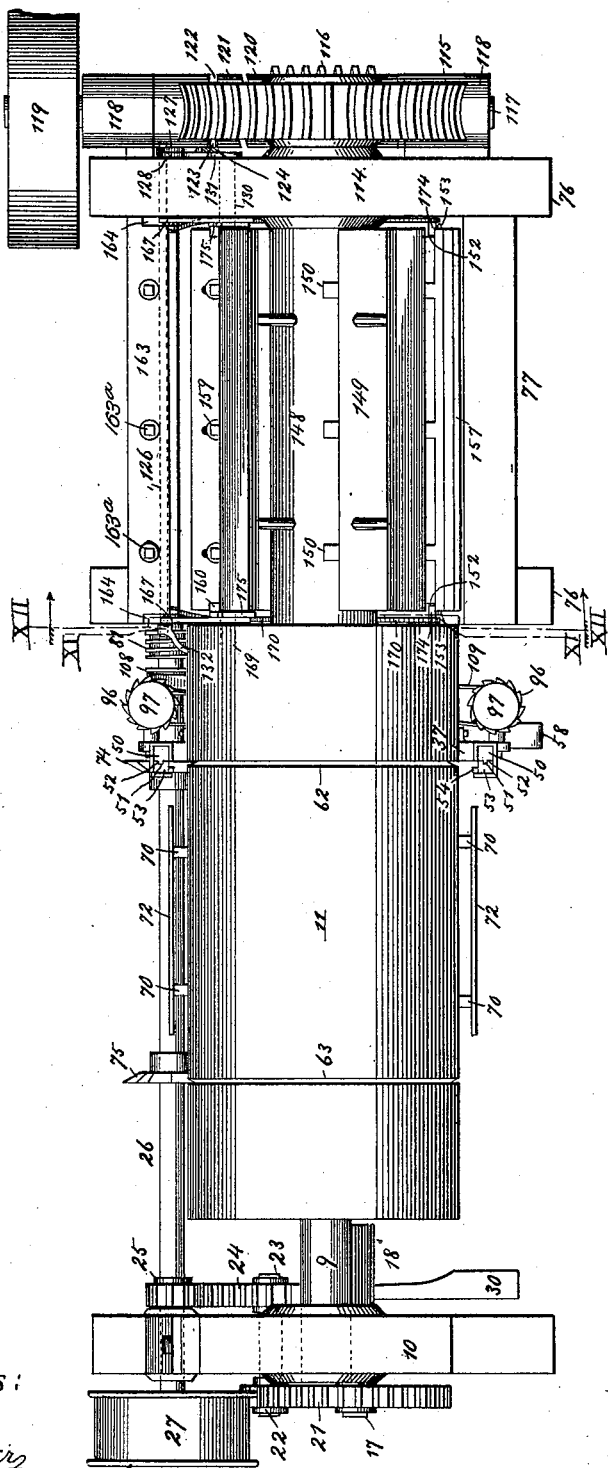

(No Model.)　　　　　　　　　　　　　　　　　10 Sheets—Sheet 1.
C. T. MURRAY.
CURVED STEREOTYPE PLATE FINISHING MACHINE.

No. 592,813.　　　　　　　　　Patented Nov. 2, 1897.

Witnesses:
F. G. Fischer
G. J. Thorpe

Inventor:
C. T. Murray
By Higdon & Higdon
Attys.

(No Model.)　　　　　　　　　　　　　　　　10 Sheets—Sheet 2.
C. T. MURRAY.
CURVED STEREOTYPE PLATE FINISHING MACHINE.
No. 592,813.　　　　　　　　　　Patented Nov. 2, 1897.

Witnesses:
F. G. Fischer

Inventor:
C. T. Murray
By Higson & Higson
Attys.

(No Model.) 10 Sheets—Sheet 3.
C. T. MURRAY.
CURVED STEREOTYPE PLATE FINISHING MACHINE.
No. 592,813. Patented Nov. 2, 1897.
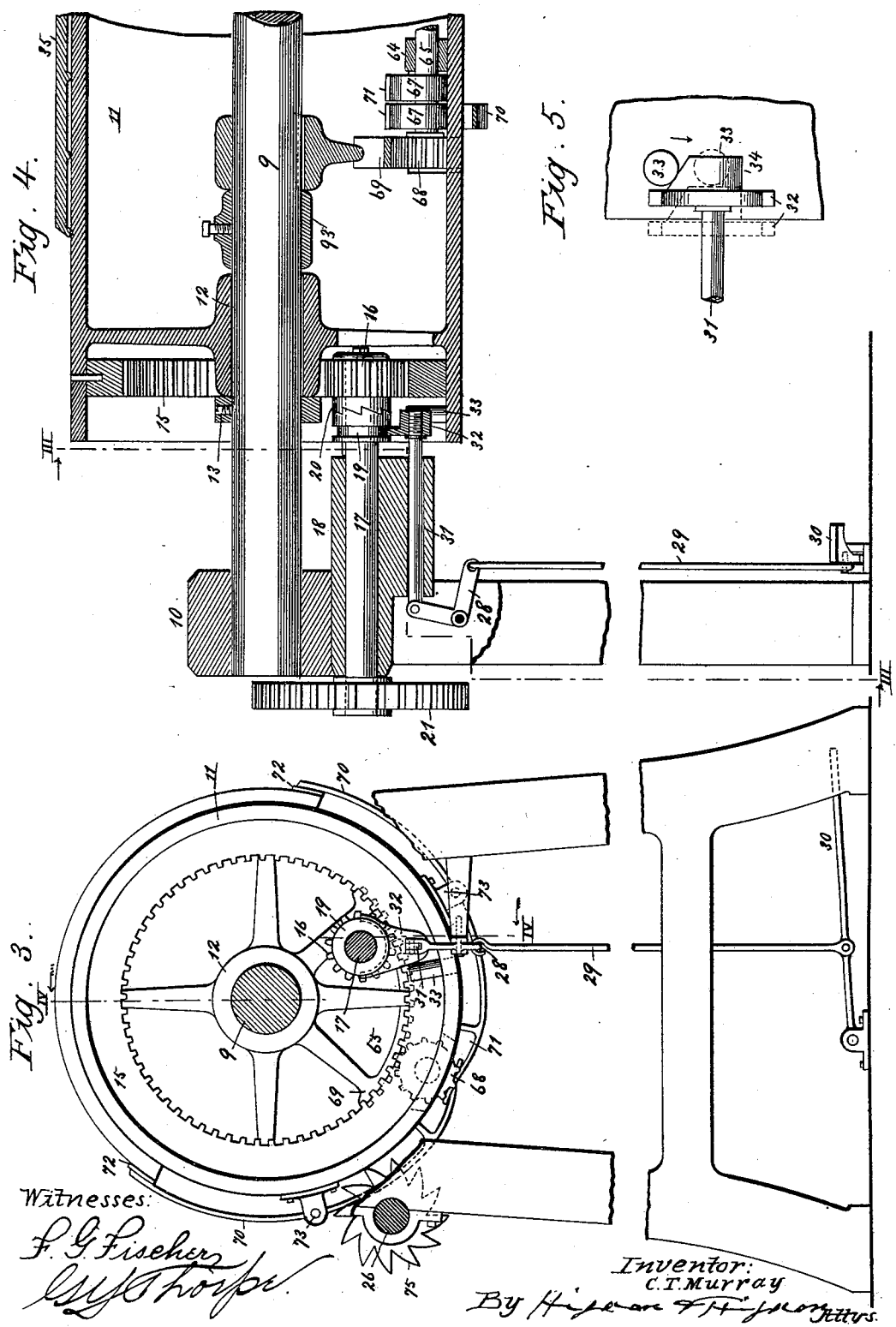
Witnesses:
F. G. Fischer
G. J. Thorpe
Inventor:
C. T. Murray
By his Attorneys

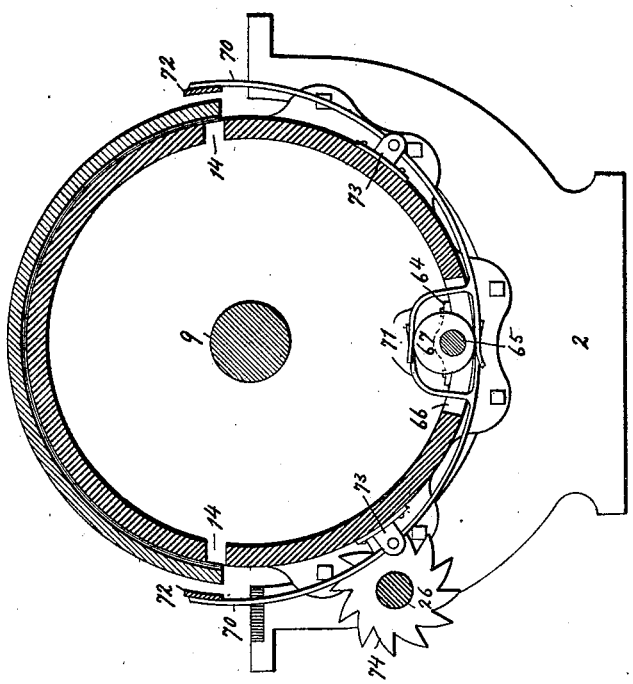

(No Model.)  10 Sheets—Sheet 5.

C. T. MURRAY.
CURVED STEREOTYPE PLATE FINISHING MACHINE.

No. 592,813.  Patented Nov. 2, 1897.

Witnesses:  Inventor:
C. T. Murray
By  Attys.

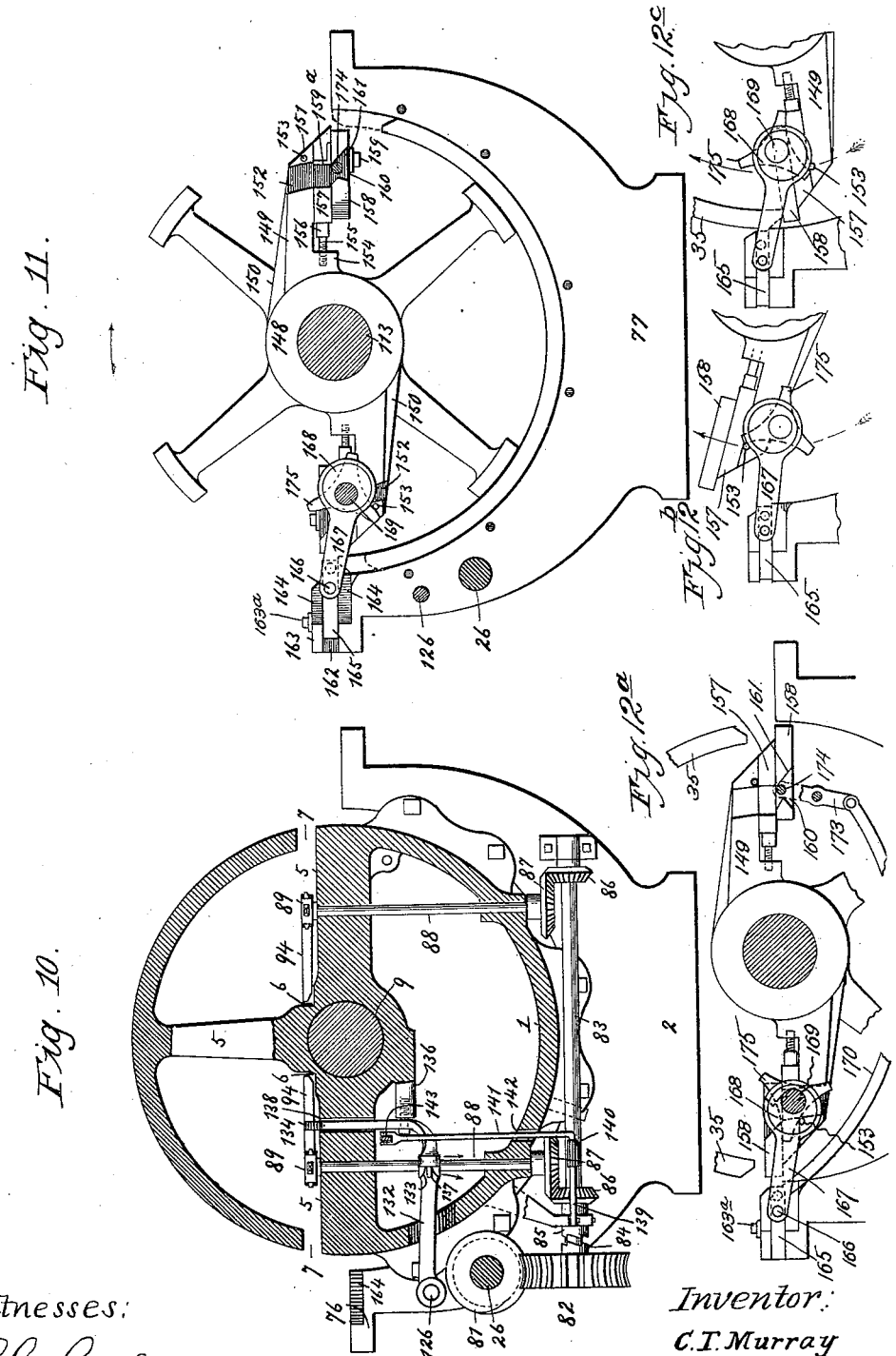

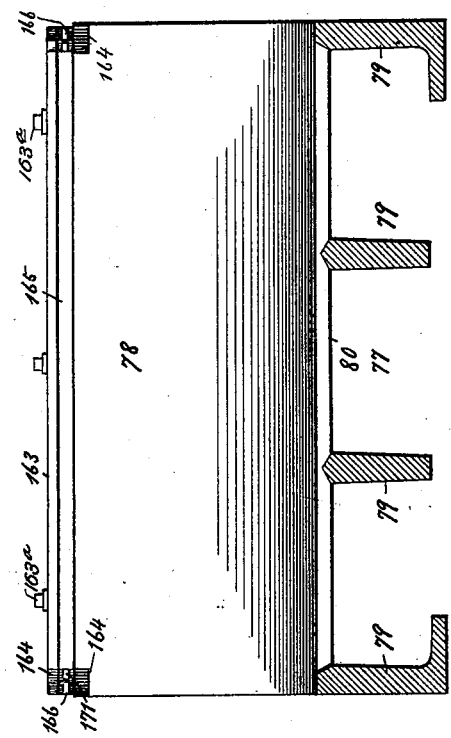

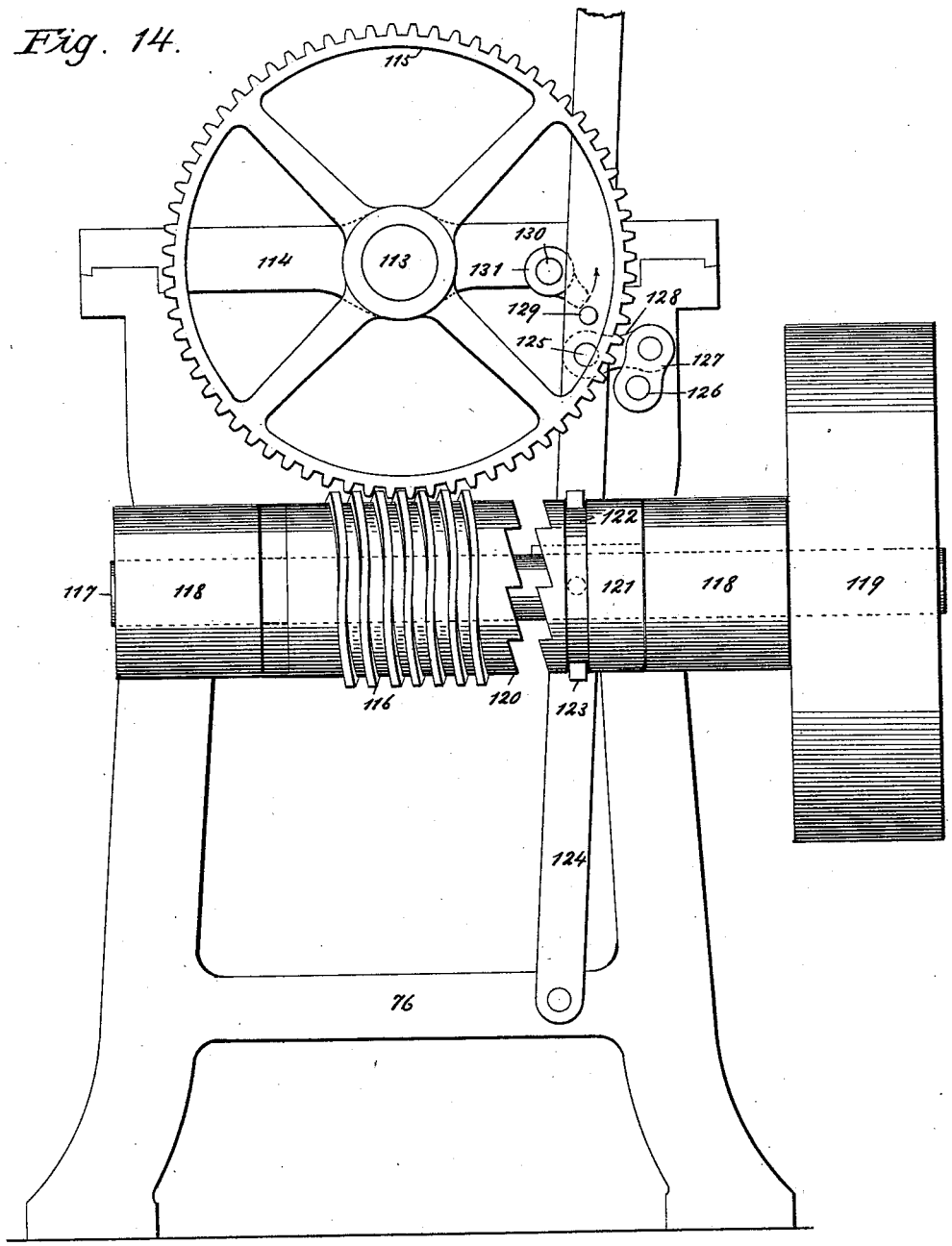

(No Model.) 10 Sheets—Sheet 9.
C. T. MURRAY.
CURVED STEREOTYPE PLATE FINISHING MACHINE.
No. 592,813. Patented Nov. 2, 1897.
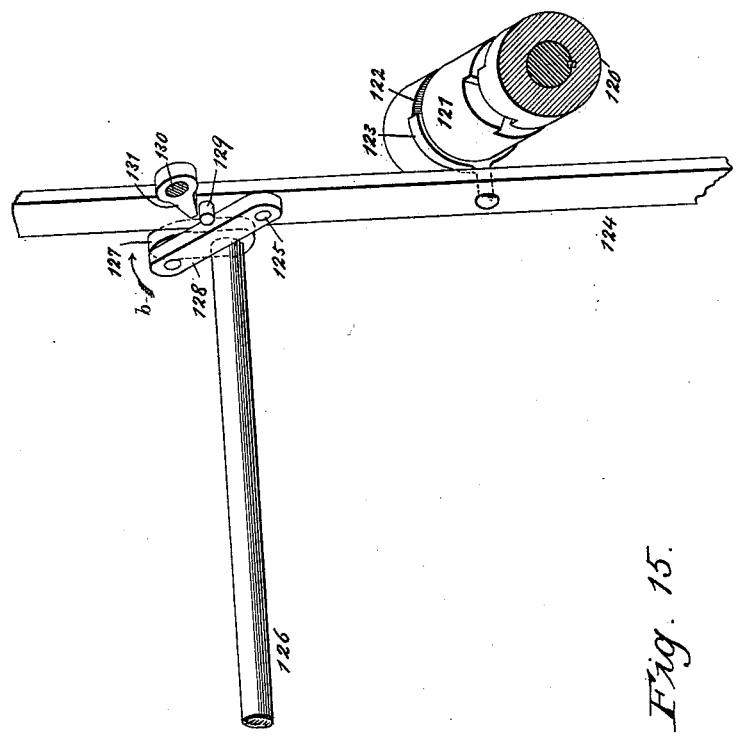
*Fig. 15.*
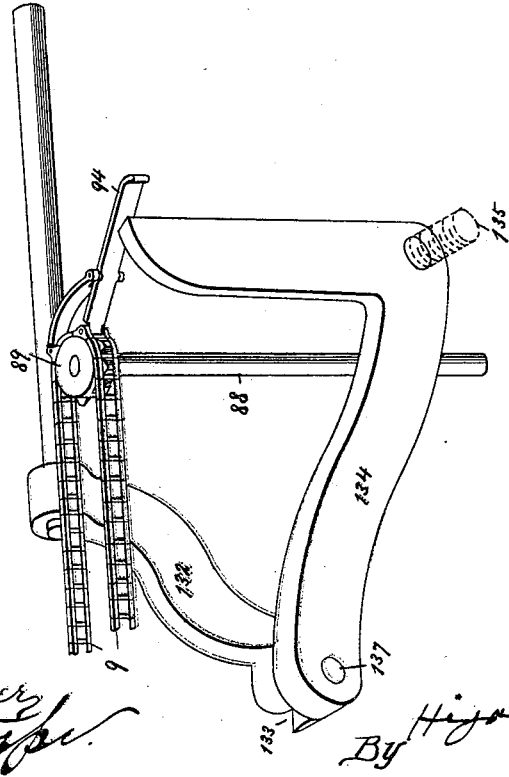
Witnesses:
F. G. Fischer
Inventor:
C. T. Murray
By Hixon & Hixon
Attys.

(No Model.) 10 Sheets—Sheet 10.
C. T. MURRAY.
CURVED STEREOTYPE PLATE FINISHING MACHINE.
No. 592,813. Patented Nov. 2, 1897.
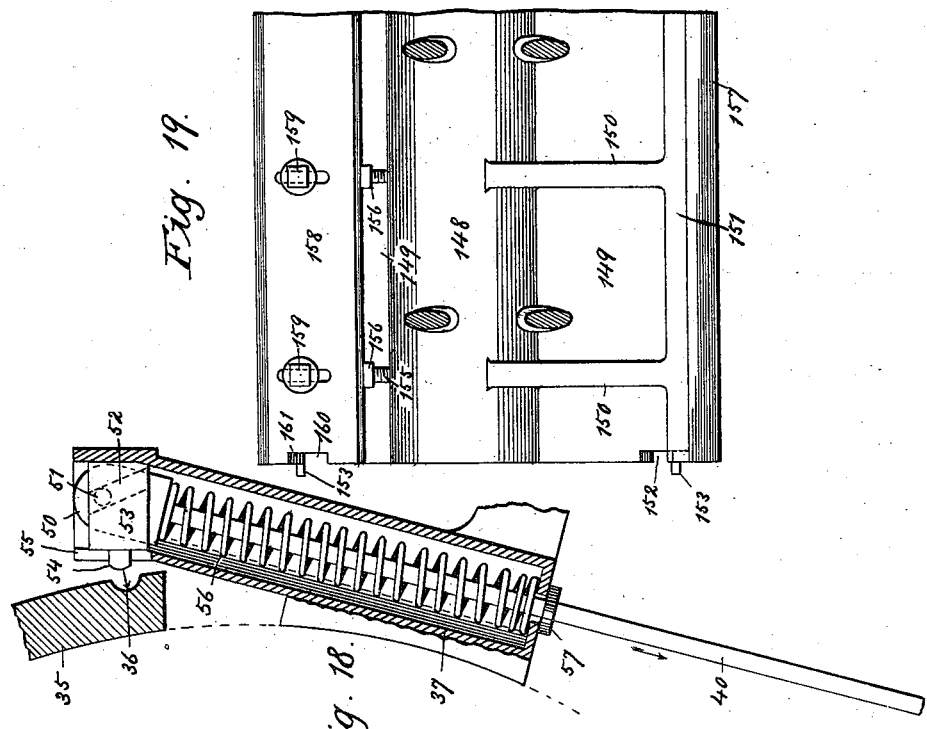
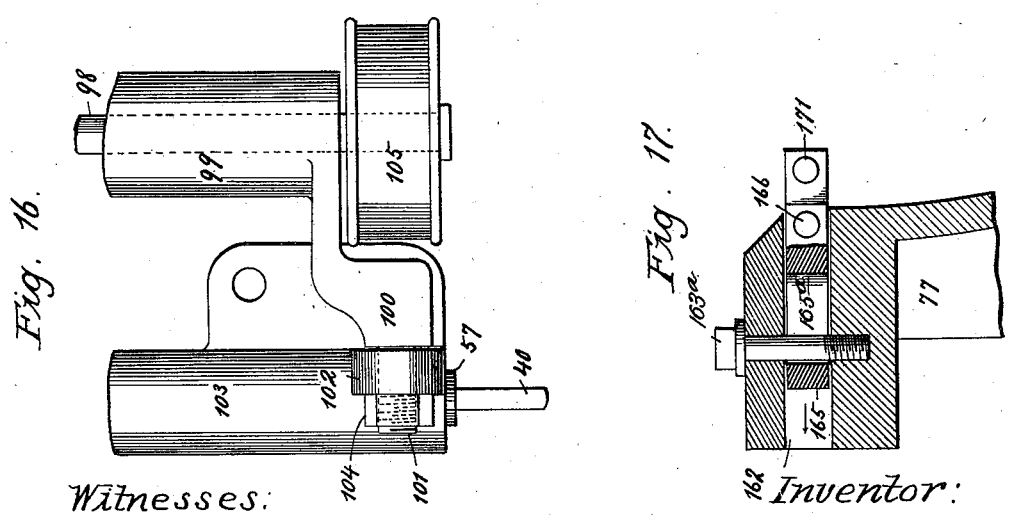
Witnesses:
F. G. Fischer
G. W. Thorpe
Inventor:
C. T. Murray
By Higdon & Higdon
Attys.

UNITED STATES PATENT OFFICE.

CHARLES T. MURRAY, OF KANSAS CITY, MISSOURI.

CURVED-STEREOTYPE-PLATE-FINISHING MACHINE.

SPECIFICATION forming part of Letters Patent No. 592,813, dated November 2, 1897.

Application filed January 16, 1897. Serial No. 619,473. (No model.)

*To all whom it may concern:*

Be it known that I, CHARLES T. MURRAY, of Kansas City, Jackson county, Missouri, have invented certain new and useful Improvements in Curved-Stereotype-Plate-Finishing Machines, of which the following is a full, clear, and exact description, reference being had to the accompanying drawings, forming a part thereof.

My invention relates to curved-stereotype-plate-finishing machines; and it consists in certain novel features of construction and combinations of parts, hereinafter to be described and claimed.

The object of the invention is to produce a machine of this character which will trim the edges of the plates and also shave its concave or inner side, so that it will be ready for application to the press for printing purposes as it emerges from said machine. This machine therefore dispenses with the tail-cutting machine, the shaving-machine, and the finishing-block, which have been heretofore necessary to finish a stereotype-plate, and also obviates the loss of time and labor necessary to transfer such stereotype-plate from the first of said machines to the second and from the second to the third.

A further object of the invention is to produce a machine which is entirely automatic, positive, and reliable in its action.

In order that the invention may be fully understood, I will proceed to describe it with reference to the said accompanying drawings, in which—

Figure 2:
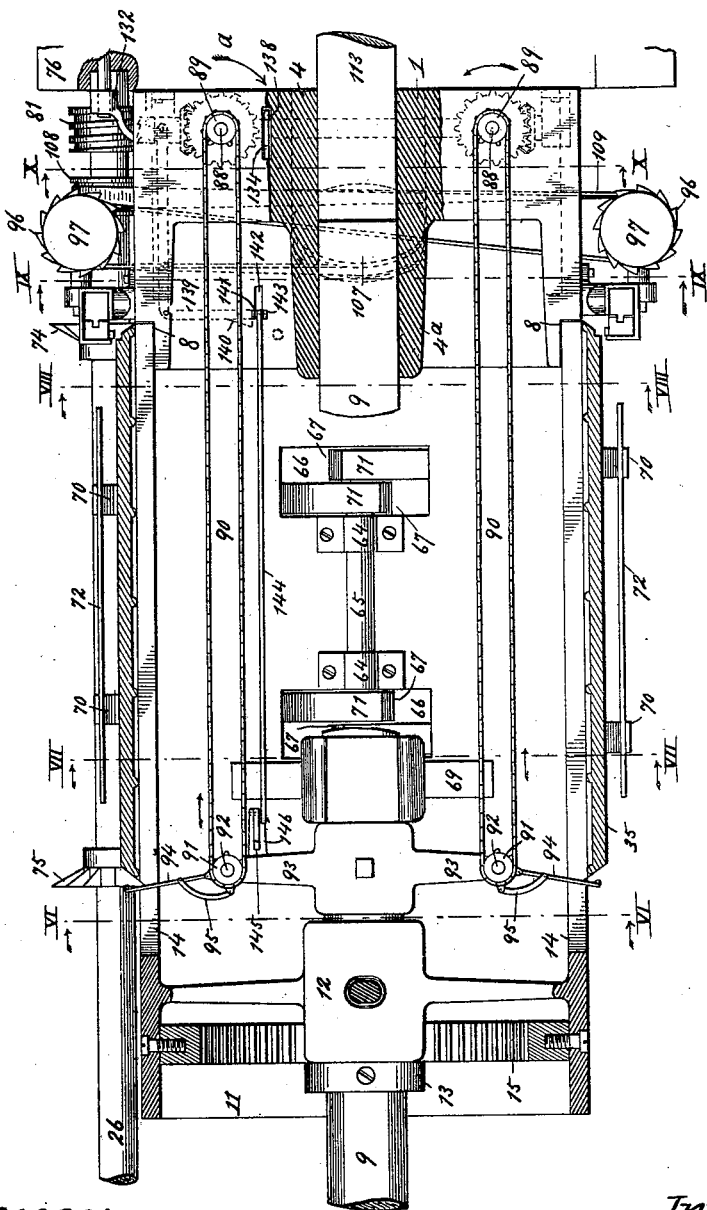
Figure 9:
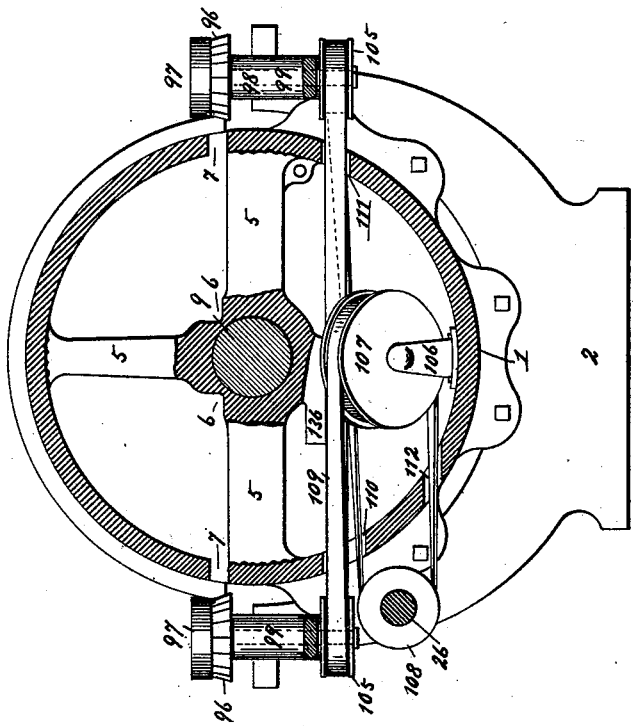
Figure 8:
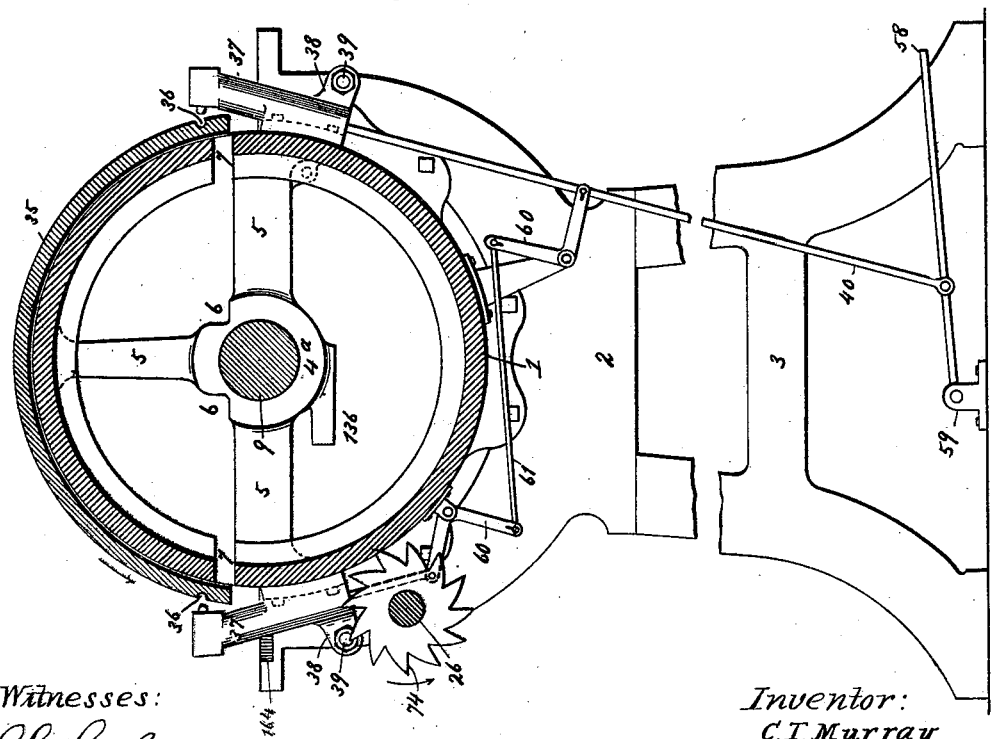

Figure 1 represents a top plan view of a machine embodying my invention. Fig. 2 represents a horizontal section of a part of the same on an enlarged scale. Fig. 3 represents a vertical section taken on the line III III of Fig. 4. Fig. 4 represents a vertical longitudinal section taken on the line IV IV of Fig. 3. Fig. 5 is a detail view on an enlarged scale, which illustrates the means of throwing the clutch shown in Fig. 4 in and out of engagement. Fig. 6 represents a cross-section taken on the line VI VI of Fig. 2. Fig. 7 represents a cross-section taken on the line VII VII of Fig. 2. Fig. 8 represents a section taken on the line VIII VIII of Fig. 2. Fig. 9 represents a section taken on the line IX IX of Fig. 2. Fig. 10 represents a section taken on the line X X of Fig. 2. Fig. 11 represents a section taken on the line XI XI of Fig. 1. Fig. 12 represents a section taken on the line XII XII of Fig. 1. Figs. $12^a$, $12^b$, and $12^c$ represent views illustrative of different positions of certain parts relating to the rotary carrier. Fig. 13 represents a vertical longitudinal section on the line XIII XIII of Fig. 12. Fig. 14 represents a rear end view of the machine. Fig. 15 represents an enlarged perspective of part of the machine. Figs. 16, 17, 18, and 19 are detail views of parts of the machine to be hereinafter described.

In the said drawings, 1 designates a cylinder which is provided with flanges bolted or otherwise secured rigidly to a bed-casting 2, surmounting a standard 3, resting or secured upon a floor or other support. Said cylinder is provided with a cylindrical hub 4, provided with an extension $4^a$ and extending radially outward from the hub, and uniting it to the shell or cylinder proper are arms 5, preferably three in number, two arranged horizontally and the third extending vertically upward from the hub. Said hub and its extension at the junction of the horizontal arms with the vertical arm are horizontally grooved, as shown at 6, for a purpose which will be hereinafter explained, and the cylinder at opposite sides and in the plane of said grooves is slotted for its full length, as shown at 7, so as to form in effect two cylindrical sections, the upper one being connected to the lower by means of the vertical arm or spoke 5. At the end of the cylinder corresponding to the free end of the extension $4^a$ of the hub, as shown clearly in Fig. 2, it is provided externally with an annular groove 8.

9 designates a shaft which is mounted at one end in the hub extension $4^a$ and at its opposite end in a bearing formed in the standard 10 of the construction shown, or any other suitable or preferred construction. This shaft does not rotate and extends concentrically of the cylinder 1, or, as it will hereinafter be termed, the "stationary" cylinder, in contradistinction to the rotating cylinder 11, of the same diameter, and mounted rotatably at one end in the annular groove of the stationary cylinder, as shown clearly in Fig. 2. Near its opposite end said cylinder 11 is provided with a hub 12, loosely mounted on said shaft, and connecting spokes, and said hub abuts at its front end against the collar 13, secured rigidly upon the shaft by means of a set-screw or otherwise. Just forward of said spokes said cylinder is provided with a pair of longitudinal slots 14, which extend clear through the opposite end of the cylinder and register with the longitudinal slots 7 of the stationary cylinder. (See Fig. 2.) At the opposite side of the spokes an internal gear-wheel 15 is secured to and within the cylinder, and meshing with the same is a cog-pinion 16, mounted loosely upon a short longitudinal shaft 17, journaled in a bearing 18, secured in any suitable manner to the standard 10. Between said bearing and said pinion an annularly-grooved clutch-section 19 is mounted slidingly but non-rotatably upon the shaft 17 and is adapted for engagement at times with the clutch-section 20, preferably cast integrally with the pinion 16. Mounted rigidly upon the opposite end of the said shaft 17 is a cog-wheel 21, and said wheel meshes with a pinion 22 of a short shaft 23, also journaled in the standard 10. Upon the opposite end of said shaft is a large cog-wheel 24, which meshes with a pinion 25 upon a shaft 26, which extends parallel with and adjacent to one side of the rotating cylinder. Said shaft is journaled at its rear end in a bearing of the standard 10 and carries a belt-wheel 27, to be connected to a countershaft or any other suitable motive power. As this belt-wheel is in continuous motion, to start the rotation of the cylinder 11 it is only necessary to slide the clutch member 19 into engagement with the member 20, and this is accomplished by the following mechanism:

28 designates a bell-crank mounted upon the standard 10, and said bell-crank is connected by the link-rod 29 with the foot-lever 30, and by the sliding rod 31, extending through a passage in the bearing 18, with the forked or bifurcated clutch-block 32, which engages at all times the annular groove of the clutch member 19. Thus it will be seen that by depressing the said foot-lever the rotating clutch member 19 is moved into engagement with the member 20, and consequently causes, through the medium of the pinion 16 and gear-wheel 15, the rotation of the cylinder 11. To arrest the motion of said cylinder positively and reliably and automatically at the completion of each revolution, it is provided with an internal pin 33, which, just before its revolution is completed, comes into contact with the beveled shoulder 34 of the clutch-block and forces said clutch-block rearwardly to the position shown in dotted lines in Fig. 5. When thus positioned, the clutch member 19 is completely disengaged from the member 20 and the motion of the cylinder immediately ceases. It will not acquire sufficient momentum to move it after the positive application of power is removed, owing to its frictional engagement with the stationary cylinder and the shaft upon which it is journaled, as will be readily understood.

When the cylinder is in a state of rest, the slots 14 register with the slots of the stationary cylinder, as hereinbefore mentioned, so that when the semicircular stereotype-plate 35, as it comes from the casting-box, is placed upon the cylinder 11, with its longitudinal margins or side edges in the same horizontal plane, said margins will be opposite said slots, as shown clearly in several figures of the drawings. To properly adjust this plate at exactly the right point upon the cylinder, it is provided externally, and at its front end preferably, with indicating marks or cavities 36, formed upon or within it in the process of casting, so that such marks will always occur at the proper point. The said cavities or marks are adapted to register with gages, described as follows:

37 designates a pair of tubular boxes or castings which are arranged at opposite sides of and against the stationary cylinder at its front end, as shown in Figs. 1 and 2, and said boxes are provided with extensions 38, bolted rigidly, as at 39, to the bed-casting 2 of the said cylinder in the same horizontal plane. Extending longitudinally through said boxes are the pull-rods 40, and mounted upon their upper ends are the heads 50, provided with forwardly-projecting pins 51, which engage inclined grooves 52 in the sliding blocks 53, provided with inwardly-projecting pins 54. In order that said blocks 53 may slide inwardly by the downward movement of the pins 51 in said grooves, the boxes are provided with openings 55 at their front sides. The springs 56 within said boxes spirally encircle said rods and tend to force them continually upward by bearing against their heads 50 and the lower ends of the boxes. This tendency toward upward movement of said pin-carrying heads consequently, when not overcome, holds the indicator-pins 54 retracted, and in order to limit the upward movement of said pull-rods they are provided with rigid collars 57, which are adapted to bear against the bottom of said boxes. These pull-rods are preferably operated by means of a foot-lever 58, mounted at one end in a bearing 59, suitably positioned, and in order that the operation of said indicator-pins may be synchronous or in unison one or both of the pull-rods may be connected to said lever.

In the drawings, Fig. 8, I have shown one pull-rod connected directly to the lever and the other connected to the first-named pull-rod through the medium of a pair of bell-crank levers 60, suitably mounted, and a link 61, connecting said bell-cranks. This, however, is only one of various particular methods that may be employed for accomplishing the purpose in view—viz., the simultaneous movement of the indicator-pins 54, so that they may enter or impinge upon the recess or mark provided in or upon the stereotype-plate, as hereinbefore referred to. When such cavities or marks register with said pins when the latter are advanced, the stereotype-plate is in position to be acted upon. In order to clamp said plate in such position, I provide the following mechanism, which may be seen most clearly in Figs. 1, 2, 3, 4, 6, and 7; but before proceeding with such description it may be well to state that the cylinder 11 is provided at the proper points externally with annular and approximately V-shaped grooves 62 and 63, which are bridged by the plate when it is arranged upon the cylinder, as hereinbefore described, such grooves determining the length of the plate, as will hereinafter appear.

64 designates a pair of bearings which are secured internally of the cylinder, and 65 a short shaft journaled therein, and mounted upon each end of said shaft beyond said bearings and occupying holes or cavities 66 in the cylinder are circular cams 67, which are so disposed and are of such diameter that when inoperative they occupy about the plane of the external surface of the cylinder, but which, when engaged in actuating the clamps, to be presently described, project beyond the surface of said cylinder. Said shaft at its front end is provided with a cog-pinion 68, which engages at times a cog-segment 69, mounted rigidly upon the stationary shaft 9. Such engagement takes place once in each revolution of the cylinder, which carries the pinion around with it, of course, and thereby causes said pinion as it comes into engagement with and rolls across the face of the segment to rotate and impart a corresponding movement to its shaft and the cams mounted thereon.

The clamps hereinbefore referred to comprise each a pair of curved arms 70, terminating in forks 71 at one end and connected at their opposite end by a longitudinally-extending bar or plate 72. The curvature of said clamps correspond approximately to that of the cylinder and are of length to extend from the shaft 65, which is vertically below the shaft 9 when the cylinder is in a state of rest, to a point opposite or slightly above the slots 14 of said cylinder. They are arranged externally of the cylinder and are pivoted about their middle in bearings 73, projecting from the cylinder, and have their forked ends 71 embracing the peripheries of the cams 67, as shown clearly in Fig. 7. Therefore when the cylinder is in a state of rest and the cam is in the position shown in said Fig. 7 the bearing-strips 72 of said clamps are held away from the cylinder or the jaws of the clamp are open, that the stereotype-plate may be easily and quickly placed in position. Now as the machine is started in motion by the depression of the foot-lever 30, as hereinbefore explained, the cog-pinion 68, which at this time is engaged with the middle of the cog-segment, starts to rotate, and by the time the cylinder has made about one-eighth of a revolution said cams 67 have completed one-half of a revolution, so as to close the jaws of the clamp and thereby cause them to impinge tightly and firmly upon the stereotype-plate by the time said pinion has become disengaged from said segment. The cams remaining in this position of course hold the plate tightly and reliably until the revolution of the cylinder is nearly completed—that is, until the cog-wheel has again come into engagement with the cog-segment at its opposite end. Immediately this reëngagement takes place the pinion begins and continues to rotate until it reaches its former position, as shown in Fig. 6, when the cylinder is brought to a state of rest by the disengagement of the clutch members, as hereinbefore described, and the jaws of the clamp are again in the position shown in Fig. 7, as will be readily understood.

74 and 75 designate rotary knives which are mounted upon the rapidly-rotating shaft 26 and are arranged opposite and adapted to work in the circular grooves 62 and 63, respectively, in the surface of the cylinder, the cutting edges of said knives corresponding approximately to the formation of said grooves, so as to trim or cut the plate on a bevel or angle.

As shown in the drawings, the groove 62, instead of being entirely in the cylinder 11, is formed conjointly by said plate and the stationary cylinder by forming the front end of the rotating cylinder on a bevel at its point of junction with said stationary cylinder, the edge of the latter serving as the abrupt wall of the groove. This causes the abrupt wall of said groove to coincide with the line of connection between the rotating and stationary cylinders, as will be clearly seen by reference to Figs. 1 and 2. Said grooves are provided in order that the knives may project beyond the inner surface of the stereotype-plate, and therefore cut clear through and trim cleanly the inner edge as well as the outer edge of the plate.

After the stereotype-plate has been properly positioned and clamped, as hereinbefore successively described, and the cylinder set in motion, it is obvious that the rotating knife 74 trims cleanly the front end of the rotating stereotype-plate and that the rotating knife 75 cuts clear through the stereotype-plate and separates the tail-plate or extension therefrom, and also trims the rear edge of the plate cleanly and evenly. In other words, said knives finish completely the front and rear margins or ends of the plate and of course determine its length, which cannot exceed the distance between the two grooves in which the knives are working. The knives finish trimming the ends of the plate about the same time or slightly before the revolution of the cylinder is completed, which, as hereinbefore stated, is brought to a state of rest precisely at the moment when the trimmed stereotype-plate resumes its original position. The next step in the operation of the machine is to advance said plate and trim or finish its side margins. This I accomplish by mechanism constructed and arranged as follows:

76 designates a standard upon which is mounted in any suitable or preferred manner the shaving-box 77, which shaving-box is of semicylindrical form and of substantially the same configuration as the bed-plate 2 of the stationary cylinder. Said shaving-box is also preferably of skeleton form—that is to say, it preferably comprises two sections 78, united by or formed integral with the semicircular depending ribs 79, certain of which are preferably flanged inward in order to be firmly secured to said standards 76 in any suitable manner. By thus casting this frame in two sections and leaving an opening or slot 80 at its center those shavings from the metal which do not gravitate to and fall through such opening may be easily and quickly discharged from the cylinder, as hereinafter more clearly appears. The inner end of the shaving-box 77 forms a journal for the front end of the shaft 26, hereinbefore described, and mounted rigidly thereon is a worm 81, which meshes continuously with a worm-wheel 82, mounted loosely upon a transverse shaft 83 below the stationary cylinder and journaled in bearings depending from said cylinder or projecting from the bed-frame thereof, as desired. (See Fig. 10.) Said worm-wheel is provided with a clutch member 84 at its inner side, which is adapted to be engaged at times by a second clutch member 85, mounted slidingly but non-rotatably upon said shaft and adapted to be actuated in the manner hereinafter described.

86 designates a pair of beveled pinions upon said shaft which mesh with a pair of beveled gear-wheels 87, mounted rigidly upon the lower ends of the vertical shafts 88, journaled at their lower ends in the circular portion of the stationary cylinder and at their upper ends in the horizontal spokes or arms thereof. Small sprocket-wheels 89, mounted rigidly upon the upper ends of said shafts, are connected by endless chains 90 with similar sprocket-wheels 91, journaled upon pins 92, secured vertically in arms 93, projecting laterally and horizontally in opposite directions from a collar near the cog-segment 69 within the rotating cylinder 11. (See Figs. 2, 6, and 10.) These endless chains are arranged in the horizontal plane of and parallel with the slots 14 and 7 of the rotating and stationary cylinders, respectively.

94 designates a pair of arms which are pivoted to and project in a horizontal plane from said chains 90. They are of sufficient length when traveling in the direction indicated by the arrows, Fig. 2, to project clear through said slots at a position about at right angles to the chain, and in such position they are reliably held by the segmental braces 95, which are pivoted at their opposite ends to said arms and to the chains to the rear of said arms, as shown clearly in Fig. 2. Said arms in practice travel in the direction indicated by the arrows, Fig. 2, and at the proper time swing around through the slots 14 and engage the front end of the stereotype-plate—that is to say, engage said plate immediately after its ends have been trimmed by the rotating knives 74 and 75 and it has resumed its original position, as indicated clearly in Figs. 6, 7, and 8. This engagement of said arms consequently forces the stereotype-plate forward, and while such movement is in progress its side margins are trimmed by the rotating beveled cutters 96. (See Figs. 1, 2, and 9.) Said rotary cutters are surmounted by and loosely carry rubber or equivalent disks 97 of slightly less diameter and are mounted upon the upright shafts 98, journaled in bearing-sleeves 99 of brackets 100, arranged parallel with and at opposite sides of the stationary cylinder. Said brackets are provided with cylindrically-threaded stems 101, mounted pivotally in arms 102, projecting from brackets 103, bolted or otherwise rigidly secured to the bed-frame 2 of the stationary cylinder. The threaded ends of said brackets are engaged by retaining-nuts 104 to prevent their disconnection. (See Fig. 16.)

Upon the lower ends of the shafts 98 are rigidly mounted belt-wheels 105.

Projecting upwardly from the bottom of the stationary cylinder is a bearing 106, and journaled therein is a comparatively large guide-wheel 107, which is arranged obliquely, so that its upper periphery is about in the plane of one side of one belt-wheel 105, while its lower periphery is about in the plane of a belt-wheel 108, mounted rigidly upon the shaft 26. (See Figs. 2 and 9.) A belt 109 extends from the upper side of the belt-wheel 108, clear across said cylinder, through openings 110 and 111, and engages the belt-wheel 105 at the opposite side of the cylinder. It then returns through said opening 111, clear across the cylinder, and through the opening 110 obliquely to the opposite side of the companion belt-wheel 105. It then extends inwardly again from said wheel to the upper side of the inclined guide-wheel 107, around which it passes, and extends thence through the opening 112 of the cylinder back to the belt-wheel 108 and is united to its opposite end, so as to constitute an endless belt, which when the shaft 26 is set in operation imparts synchronous movement to the shafts 98 and consequently to the rotary cutters 96. Thus it will be seen that the rotary movement of the shaft 26 through the connections described keeps the rotary cutters 96, hereinafter termed the "side cutters or trimmers," in constant action, and owing to the fact that the brackets 100 are pivotally mounted it is obvious that any slight irregularities in the surface of the stereotype-plate engaged by rollers or disks 97, surmounting said cutters, will throw the latter outwardly from engagement with the stereotype-plate and hold them in such position until said irregularity in the surface of the plate has passed beyond said rollers or disks 97. As a consequence the portion of the plate upon which are formed the heading and the folio is left intact. If these trip-rollers were not employed, it is obvious that the rotary cutters would trim the plate from one end to the other, and consequently take off the folio and heading and irreparably injure the plate.

113 designates a shaft which is journaled at one end in the hub of the stationary cylinder 1 and at its opposite end in the cross-bar 114, mounted upon the upper end of the foremost or end standard of the machine. A large worm-wheel 115 is mounted upon the extreme end of said shaft and meshes continuously with the worm 116, mounted loosely upon the transverse shaft 117, journaled in bearings 118, projecting from the standard 76 and carrying a belt-wheel 119, adapted to be belted to a counter-shaft or other motive power. (Not shown.) The worm 116 is formed with a clutch member 120, adapted for engagement with a companion clutch member 121, slidingly, but non-rotatably, mounted upon said shaft and limited as to movement in one direction by a bearing 118 and in the opposite direction by said clutch member 120.

The clutch member 121 is provided with an annular groove 122, engaged by a bifurcated arm or fork 123, pivotally carried by an upright lever 124, which lever is adapted to work in a plane between the wheel 115 and the standard 76. Said lever is provided with a pin 125, connected by a toggle-joint with a longitudinally-extending rod or rock-shaft 126, journaled at its rear end in said standard 76, said toggle consisting, preferably, of the crank-arm 127, mounted rigidly upon said rod, and a link 128, pivotally connecting the outer end of said link-arm with the pin 125. Just upward of the link 128 the rod is provided with an inwardly-projecting pin 129, adapted to be engaged once in each revolution of the shaft 130 by the cam 131, mounted rigidly thereon, and hereinafter more particularly referred to. The opposite end of the rod or shaft 126 is journaled in the inner standard 76, (see Fig. 2,) and mounted rigidly thereon and projecting inwardly therefrom is an arm 132, said arm extending through an opening into the lower portion of the stationary cylinder 1 (see Fig. 10) and having its free end provided with a longitudinal slot 133.

134 designates a bell-crank lever which is mounted pivotally upon the bolt 135, projecting horizontally from the extension 136 of the hub 4 of the stationary cylinder. Said lever is adapted to work in a vertical plane and has its horizontal arm slidingly connected with the free end of the arm 132 by a pin 137, which engages the slot 133, and has its vertical arm projecting upwardly through a longitudinal slot 138, formed in one of the spokes or arms 5 of said stationary cylinder, so that as the arms 94 of the endless chains 90 swing around in the direction indicated by the arrows $a$ the one at the corresponding side of the cylinder will engage the upwardly-projecting end of the said bell-crank lever (see Figs. 2, 10, and 15) and pivotally operate it until its upper end swings about to the plane of said spokes or arms 5 and permits the push-arm 94 to pass from engagement with it. This pivotal operation of said lever depresses the free end of the arm 132 and rocks the rod or shaft 126 in the direction indicated by the arrow $b$, (see Fig. 15,) and consequently expands said toggle-joint hereinbefore described and causes the lever 124 to move the clutch member 121 into engagement with the clutch member 120. Immediately this takes place the worm 116 starts to revolve and imparts a slow rotary motion to the shaft 113, for a purpose which will presently appear.

In order to set the endless chains 90 in operation automatically, I provide mechanism as follows:

139 (see Figs. 2 and 10) designates a bell-crank lever which is pivotally mounted to swing in a horizontal plane upon one of the bearings in which the shaft 83 is journaled or in any other suitable manner, and said lever embraces the clutch-section 85 in the customary manner, so as to permit it to rotate and yet to slide it in one direction or the other, as required to throw it in or out of engagement with the clutch member 84. The opposite end of said lever is provided with an inclined shoulder or cam 140 and at its end is bent upwardly or is provided with an upwardly-extending arm 141. Said arm projects through an opening 142 in the lower portion of the stationary cylinder and is pivotally connected at its upper end, as shown at 143, with a longitudinally-extending rod 144, pivotally connected in turn at its opposite end to an upwardly-projecting lever 145. Said lever, below said point of connection, is pivotally mounted upon an arm 146, depending at an angle from one of the arms 93 of the said collar, and has its upper end in the path of the push-arm 94 of said chain, so that said push-arm as it reaches a point superposed with relation to the cog-segment strikes and pivotally operates said lever and, through the medium of connections just described, throws the clutch-section 85 out of engagement with the clutch-section 84, and thereby stops the operation of said endless chain. In other words, the endless chains by operating said lever periodically throw themselves out of gear and arrest their own motion. As said chains must be set in motion immediately after the rotation of the cylinder 11 is completed and the ends of the stereotype-plate are trimmed, and as this must be accomplished automatically to provide a practical machine, I provide the cylinder 11 at the proper point with an external pin or shoulder 147, which just before the revolution of the cylinder is completed comes into engagement with the cam or inclined shoulder 140 of the bell-crank lever 139, and thereby operates the same and throws the clutch-section 85 into engagement with the clutch-section 84 and sets the shaft 83 and its connected parts in operation.

In order to receive the stereotype-plate as it is forced forwardly by the push-arms 94, I mount rigidly upon the shaft 113 a rotary frame or carrier 148, which carrier operates within the semicircular shaving-box 77. (See Figs. 1, 11, and 12.) This frame or carrier preferably comprises a hub portion and a series of radial arms having their outer ends preferably enlarged and arranged concentrically with reference to the axis of the shaft 113. When said rotary carrier is in its normal position or state of rest, certain of said arms are in proper position to receive the stereotype-plate at its concave side as it is fed forwardly from the stationary cylinder. Immediately after this takes place the push-arm 94, as hereinbefore described, operates the lever 134 and through the medium of the mechanism described (see Fig. 15) sets the rotary carrier in operation in the direction indicated by the arrow, Fig. 11. Owing to the size of the said stereotype-plate it is obvious that immediately after this rotary movement begins its advanced end will pass down into the shaving-box and thus insure its proper entrance therein. By the time the rotary carrier has completed a half-revolution the stereotype-plate has assumed the position shown in full lines, Fig. 12, and dotted lines, Fig. 11, and in order to shave the concave or upwardly-disposed surface until said plate has been reduced to the thickness required for use upon the printing-press (not shown) for which it is adapted I employ mechanism to be presently described.

The rotary carrier is provided at diametrically opposite points with the outwardly-projecting arms 149, which extend from one end of the carrier to the other, preferably strengthened or reinforced by ribs 150, cast integral with said arms. The outer ends of said arms are beveled so as to form parallel surfaces 151, and at their opposite ends they are provided with grooves 152 and outward of said grooves with the pins 153. They are also recessed to form parallel surfaces and shoulders 154, into which screw-bolts 155 project. Said bolts are provided with rectangular enlargements 156, by which they may be turned, in order to advance or retract the shaving-knives 157, occupying positions between said parallel surfaces and the plates 158, bolted, as shown at 159, to said arms 149. (See Figs. 1, 11, 12, and 19.) Said knives, which have their outer ends beveled in the same degree as the surfaces 151 of said arms, project at times (but never both at once) slightly beyond the outer edges of the corresponding plates 158, and are also provided in their ends with grooves 159$^a$, registering with the grooves 152 of said arms. In the ends of said plates are also formed registering grooves 160, the inner walls of said grooves being approximately V-shaped in end view, while the outer walls 161 extend approximately parallel with the cutting edges of the knives, for a purpose to be presently explained.

At one side of the machine the shaving-box 77 is provided with a horizontal passage 162, extending its full length and formed, preferably, by securing above and parallel with it a plate 163 by means of bolts 163$^a$, (see Figs. 1, 11, 12, and 13,) and said plate and also said shaving-box at its opposite ends are recessed, as shown at 164, for a purpose which will presently appear.

165 designates a sliding plate or block which fits in the passage 162 and is provided at its opposite ends with pins 166. Said plate is provided with slots 165$^a$, Fig. 17, through which the bolts 163$^a$ extend and perform the function of guides when the plate is adjusted, as hereinafter and for a purpose explained.

167 designates straps or arms of a pair of eccentrics 168. The rearmost eccentric is mounted upon a short shaft 169, suitably journaled in a stationary part of the machine, while the companion eccentric (not shown) is mounted rigidly upon the short shaft 130, hereinbefore described and illustrated in Fig. 15, which is journaled in the bearing-bar 114 of the end standard 76, as shown clearly in Fig. 14. The said cam 131 of the shaft 130, arranged in longitudinal alinement with the short shaft 169, (see Fig. 11,) once in each complete revolution engages the pin 129 of the lever 124 and, operating said lever, throws the clutch member 121 out of engagement with the clutch member 120, and consequently brings the rotary carrier to a state of rest.

The sliding block 165 is adapted to be interposed in the path of the stereotype-plate just before and until after the shaving-knife operates upon said stereotype-plate, and this I accomplish by the following mechanism:

170 designates a pair of curved links (one only of which is shown) arranged at opposite ends of the rotary carrier, and said links extend transversely of the machine and at their higher ends are pivotally engaged by pins 171, projecting from the opposite ends of the sliding stop-plate 165, said levers being bent, as indicated by shade lines, Fig. 12, so as to pass within the arms 167, engaging pins 166 of said stereotype-plate without conflict with said arms, as will be readily understood. The opposite ends of said links are pivotally connected, as at 172, to the lower ends of a pair of rock-levers 173, (only one of which is shown,) the pivots of said levers being independent and projecting from stationary portions of the machine, so as not to interfere with the rotary operation of the carrier. The upper ends of said levers are provided with inwardly-projecting studs 174, which are engaged by the walls of the adjustable blocks 158, which hold the knives 157 in position. Mounted rigidly upon the shafts 130 and 159 in the path of the pins 153, projecting from opposite ends of the carrier, are a pair of triangular cams 175, one only of which appears in the drawings—viz., that upon the shaft 159—and in order to avoid confusion in tracing the general operation of the machine reference to said pins and cams will be in the singular.

Supposing the carrier and the controlling mechanism shown in Fig. 12ᵃ to be stationary and in the relative positions shown in said figure, the next step in the operation of the machine is the deposit upon the carrier of a stereotype-plate by means of the push-arms of the endless chains, as already described. Immediately thereafter said push-arms, as also previously explained, engage and operate the lever 134 and, through instrumentalities described, and shown at Fig. 15, throw the carrier in gear with the shaft 117. The carrier then begins to rotate in the direction indicated by the arrow, Fig. 11, and at the beginning of such rotatable movement the pin 153 of the arm 149 below and rearward of the stereotype-plate (with respect to the direction of rotation) engages one arm of and turns the triangular cam one-sixth of a circle before it passes it, as illustrated in Figs. 12ᵃ and 12ᵇ, the former figure showing the pin and cam before and the latter after such movement has occurred. The carrier continues such movement and at the end of one half-revolution has deposited the stereotype-plate in the shaving-box, as shown in Fig. 12. That this disposition of the plate may be positively and reliably obtained the sliding blocks 158 are advanced or projected outwardly beyond the knives 157, (see Fig. 12ᵃ,) so that the one carried by the same arm 149 as the pin 153, above referred to, will insure, by positive pressure, if necessary, its proper deposit in the shaving-box below, while the other performs the function of sweeping the interior of the shaving-box by pushing any metal shavings therein down through the slot 80 or up and out of the shaving-box at its opposite side. It also will stop and hold the stereotype-plate if it slips forward on the carrier when rotating.

Just before the first half-revolution is completed the pin 153 of the arm 149, carrying the block referred to as sweeping the shaving-box, engages the second or following arm of the triangular cam and by the time the first half-revolution of the carrier is completed and shortly after the second half-revolution is begun moves it one-third of a revolution and thereby disposes the inner end of the sliding stop-plate 165 in the path of the upward movement of the stereotype-plate, as shown clearly in Fig. 11. This is accomplished by reason of the fact that the rotatable movement of the cam 175 imparts a corresponding movement to the eccentrics 168. This movement of the eccentrics interposes their narrowest portions between the axes of the shafts 169 and the pivotal points 166, and consequently shortens the distance between such points. The various step-by-step movements of the triangular cams 175 of course are accompanied by like movements of the cam 131. (See Fig. 15.)

By moving the stop-plate 165 inward at the close of the first half-revolution, as described, it causes the operation of the rock-levers 173 through the instrumentalities of the links 170 and disposes the studs or pins 174 of said levers in the path of the inner inclined or V-shaped walls of the approaching block 158, and thereby moves or slides said block inwardly until the knife is uncovered, as shown clearly in Fig. 12. Thus at the beginning of the second half-revolution it will be seen that the stop-plate 165 overhangs the casting-box at one side and is in position to limit any upward movement of the stereotype-plate and the knife at the opposite side of the machine is approaching the rear end of the said plate, being properly adjusted in advance of course to trim the concave side of the plate to the requisite depth. Immediately said knife engages the plate it pushes it until its opposite end abuts against the stop-plate 165, and then, as the plate can move no farther, the knife begins and continues to shave the interior or concave side of the plate until the pin 153 of the corresponding arm 149 near the close of the second half-revolution of the carrier engages and operates the third arm of the cam 175. This engagement takes place as the shaving operation is completed and so disposes the eccentrics that the stop-plate 165 is moved out of the path of the stereotype-plate and the studs or pins 174 (by such movement of the stop-plate) are moved out of the path of the inner walls and into alinement with the passages or grooves of the approaching block 158 because that particular block has not been retracted. As said block is not retracted and the stop-plate is out of the way, it is obvious that it engages the rear end of and pushes the stereotype-plate up and out of the shaving-box with the third half-revolution of the carrier, as indicated by Fig. 12ᶜ. Just before said movement is completed, however, the pin 153 of the arm 149, carrying the said block, engages the arm of the triangular cam described as first engaged and moves it from the position shown in Fig. 12ᶜ to that shown in Fig. 12ᵃ, a distance of one-sixth of a revolution, making in all one complete revolution of the said cam. Immediately this is accomplished the carrier stops, being thrown out of gear with the shaft 113, Figs. 14 and 15, by means of the cam 131, which took the last step (one-sixth) of its revolution synchronously with cam 175, and engaging the pin 129 operated the lever 124 and disengaged the clutches 120 and 121, as hereinbefore explained.

Thus it will be apparent that a plate in its unfinished state—that is, as it comes from the casting-box—after being placed and properly positioned upon the cylinder 11 by means of the indicator-pins 54 and the machine set in operation by the depression of the foot-lever 30 is automatically brought to a finished state in a few minutes by the successive action thereon of the knives which trim its ends, those which trim its sides, and that which shaves its concave surface and reduces the plate to the required thickness.

It will be obvious that said knives 157 of the rotary carrier alternately perform the shaving operation and that it requires three half-revolutions of said carrier to place the plate in the shaving-box, to shave it, and to remove it from said box and dispose it in its original position upon the carrier, whence it may be easily and conveniently removed.

It will also be obvious that it requires four engagements of the pins 153 with the triangular cams 175 to cause four steps or movements, or one complete revolution, of the cam 131, and consequently that the carrier periodically moves a distance of one and one-half revolutions with each operation, and that the said cam 131 once in each complete revolution, through the instrumentalities described, brings said carrier to a state of rest.

It is to be understood, of course, that the substitution of mechanical equivalents for any of the parts described and that changes in the form, detail construction, proportion, and organization may be made without departing from the spirit and scope of my invention.

Having thus described the invention, what I claim as new, and desire to secure by Letters Patent, is—

1. In a machine of the character described, the combination of a rotating cylinder, indicator-pins to determine the position of a curved stereotype-plate upon said cylinder, means to clamp said plate firmly upon the cylinder, and knives to trim its ends during the revolution of the cylinder.

2. In a machine of the character described, the combination of a stationary shaft suitably journaled, a cylinder mounted to rotate around said shaft, means to clamp a stereotype-plate firmly upon said cylinder, gearing to rotate said cylinder, means to trim the ends of said plate while the cylinder is revolving, and means to automatically bring said cylinder to a state of rest at the moment one revolution has been completed.

3. In a machine of the character described, the combination of a stationary shaft suitably supported, a cylinder surrounding and adapted to rotate around said shaft, means for clamping a stereotype-plate upon the cylinder, a rotating shaft, a pinion mounted loosely thereon, an internal ring of said cylinder geared to said pinion, means for imparting movement from said rotating shaft to said pinion, means for trimming or beveling the ends of the stereotype-plate as the cylinder revolves, and means for stopping the rotation of said pinion and consequently of the cylinder when the latter completes one revolution, substantially as described.

4. In a machine of the character described, the combination of a stationary shaft suitably supported, a cylinder surrounding and adapted to rotate around said shaft, means for clamping a stereotype-plate upon the cylinder, a rotating shaft, a pinion mounted loosely thereon, an internal ring for said cylinder geared to said pinion, means for imparting movement from said rotating shaft to said pinion, means for trimming or beveling the ends of the stereotype-plate as the cylinder revolves, and a pin projecting inwardly from the cylinder and adapted to throw said rotating shaft and pinion out of gear, and bring the cylinder to a state of rest when it completes one revolution, substantially as described.

5. In a machine of the character described, the combination of a cylinder suitably journaled, means for clamping a stereotype-plate thereon, means for trimming the ends of the stereotype-plate during the revolution of the cylinder, a rotating shaft, a clutch-section mounted to slide and rotate with said shaft, an internal gear secured to the cylinder, a pinion engaging the same, mounted loosely upon said shaft and provided with a clutch member, means to throw the first-named clutch member into engagement with the last-named clutch member to cause the rotation of the cylinder, and means to return said clutch member to its original position automatically at the completion of one revolution of the cylinder, substantially as described.

6. In a machine of the character described, the combination of a cylinder suitably journaled, means for clamping a stereotype-plate thereon, means for trimming the ends of the stereotype-plate during the revolution of the cylinder, a rotating shaft, a clutch-section mounted to slide upon and rotate with said shaft, an internal gear secured to the cylinder, a pinion engaging the same, mounted loosely upon said shaft and provided with a clutch member, a fork embracing said last-named clutch member so as to slide it in one direction or the other without interfering with its rotatable movement, and provided with a cam or beveled shoulder, means to advance said fork and consequently said clutch member into engagement with its companion clutch member, and a pin projecting internally of the cylinder to engage the cam or beveled shoulder of said fork and thereby disengage said clutch member and bring the cylinder to a state of rest, substantially as described.

7. In a machine of the character described, the combination of a cylinder suitably journaled, means for clamping a stereotype-plate thereon, means for trimming the ends of the stereotype-plate during the revolution of the cylinder, a rotating shaft, a clutch member mounted to slide upon and rotate with said shaft, an internal gear secured to the cylinder, a pinion engaging the same, mounted loosely upon said shaft and provided with a clutch member, a fork embracing said last-named clutch member so as to slide it in one direction or the other without interfering with its rotatable movement, and provided with a cam or beveled shoulder, a foot-lever connected to advance said fork and consequently said clutch member into engagement with its companion clutch member, and a pin projecting internally of the cylinder to engage the cam or beveled shoulder of said fork and thereby disengage said clutch member and bring the cylinder to a state of rest, substantially as described.

8. In a machine of the character described, the combination of a cylinder suitably journaled, means for clamping a stereotype-plate thereon, a rotating shaft, intermediate gearing between said shaft and the cylinder to cause the latter to make one complete revolution, and knives mounted rigidly upon said shaft and adapted to trim the ends of the stereotype-plate to a bevel as the cylinder turns, substantially as described.

9. In a machine of the character described, the combination of a cylinder suitably journaled, indicator-pins for determining the position of a curved stereotype-plate upon the cylinder, means to clamp said plate upon the cylinder, a rotating shaft, intermediate gearing between said shaft and the cylinder to cause the latter to make one complete revolution, and knives mounted rigidly upon said shaft and adapted to trim the ends of the stereotype-plate to a bevel as the cylinder turns, substantially as described.

10. In a machine of the character described, the combination of a stationary shaft suitably journaled, a cylinder concentrically surrounding the same and suitably journaled, and adapted to receive externally a curved stereotype-plate, a short shaft journaled in the cylinder parallel with its axis, eccentrics upon the same, clamping devices to engage the opposite sides of the curved stereotype-plate and engaging and adapted to be actuated by said eccentrics, gearing between said stationary shaft and said short shaft, whereby the latter is caused to make a half-revolution and apply the clamps to the stereotype-plate, and then a second half-revolution to disengage said clamps from the stereotype-plate as the revolution of the cylinder is completed, for the purpose set forth.

11. In a machine of the character described, the combination of a stationary shaft, a cylinder mounted to rotate around the same, and to receive externally a curved stereotype-plate, a cog-segment depending rigidly from said stationary shaft, a short shaft journaled in the cylinder parallel with its axis, a pinion thereon, eccentrics thereon, quadrant-shaped clamping devices pivoted externally of and carried by the cylinder, and provided with forks which peripherally embrace said eccentrics, and means to rotate said cylinder and consequently cause said pinion to engage and be operated by said segment, for the purpose set forth.

12. In a machine of the character described, the combination of a stationary shaft, a cylinder concentrically surrounding said shaft, indicator-pins for positioning a curved stereotype-plate upon the cylinder, means to clamp the stereotype-plate in position upon the cylinder at the beginning of the cylinder's movement and to release said plate at the end of such movement automatically, means to rotate said cylinder a distance of one revolution only, and means for trimming to a bevel the ends of said stereotype-plate during the revolution of the cylinder, substantially as described.

13. In a machine of the character described, the combination of a cylinder, and devices for positioning a curved stereotype-plate thereon, consisting of a tube at each side of the cylinder, having openings at their upper inner sides, blocks in the upper ends of said tubes and provided with inwardly-projecting indicator-pins, and with downwardly and outwardly extending grooves, a spring for holding said blocks and pins normally retracted, and means for overcoming the resistance of said spring and advancing said pins to position the plate upon the cylinder, substantially as described.

14. In a machine of the character described, the combination of a cylinder, and devices for positioning a curved stereotype-plate thereon, consisting of a tube at each side of the cylinder, having openings at their upper inner sides, blocks in the upper ends of said tubes and provided with inwardly-projecting indicator-pins, and with downwardly and outwardly extending grooves, rods extending longitudinally of said tubes, and provided with heads at their upper ends having pins projecting laterally into the grooves of said blocks, springs surrounding said rods and interposed between said heads and the bottom of said tubes to hold the blocks retracted, collars upon said rods to limit their upward movement, and a lever pivotally connected to operate said rods and simultaneously advance said indicator-pins, substantially as described.

15. In a machine of the character described, the combination of a cylinder constructed to receive a curved stereotype-plate, means to slide said stereotype-plate forwardly upon said cylinder, and means to trim or bevel the side margins of said plate during its advance movement, substantially as described.

16. In a machine of the character described, the combination of a cylinder, means to slide forwardly a curved stereotype-plate resting upon said cylinder, means to trim the side margins of said plate to a bevel, and means to engage frictionally said stereotype-plate, and, by contact with the folio and heading thereof, to adjust said cutting or trimming mechanism outwardly, that said folio and heading may be left intact, substantially as described.

17. In a machine of the character described, the combination of a cylinder constructed to receive a curved stereotype-plate, means to slide said stereotype-plate forwardly upon said cylinder, and rotating beveled knives to engage and trim the side margins of said stereotype-plate to a bevel during its advance movement, substantially as described.

18. In a machine of the character described, the combination of a cylinder constructed to receive a curved stereotype-plate, means to slide said plate forwardly upon said cylinder, rotating knives in the path of and adapted to trim the side margins of said plate to a bevel, and trip-rollers surmounting said knives, and adapted, by contact with the folio and heading of the stereotype-plate to rotate and to adjust said knives outwardly, that said folio and heading may be left intact, substantially as described.

19. In a machine of the character described, the combination of a cylinder, constructed to receive a curved stereotype-plate, brackets pivotally mounted at the front end and opposite sides of said cylinder, shafts journaled thereon, rotary cutters upon the upper ends of said shafts, trip-rollers surmounting said cutters, means to impart continuous rotary movement to said shafts, and hold the cutters and trip-rollers yieldingly inward, and means to slide said stereotype-plate forwardly into contact with said rotary cutters and said trip-rollers, substantially as described.

20. In a machine of the character described, the combination of a cylinder, constructed to receive a curved stereotype-plate, brackets pivotally mounted at the front end and opposite sides of said cylinder, shafts journaled therein, rotary cutters upon the upper ends of said shafts, trip-rollers surmounting said cutters, a continuously-rotating shaft, gearing between the same and said cutter-shafts to continuously rotate the latter and hold them yieldingly inward, and means to slide said plate forwardly against said rotary cutters and trip-rollers, substantially as described.

21. In a machine of the character described, the combination of a cylinder, constructed to receive a curved stereotype-plate, brackets pivotally mounted at the front end and opposite sides of said cylinder, shafts journaled therein, rotary cutters upon the upper ends of said shafts, trip-rollers surmounting said cutters, belt-wheels upon said cutter-shafts, an inclined guide-pulley, a continuously-rotating shaft, a pulley thereon, an endless belt connecting the same with the belt-pulleys of the cutter-shaft and engaging said guide-pulley, and means to move the stereotype-plate forwardly against said rotating cutters and trip-rollers, substantially as described.

22. In a machine of the character described, the combination of a stationary cylinder provided with longitudinal slots, a rotatable cylinder provided with longitudinal slots, devices for positioning a stereotype-plate upon said cylinder so that it overlaps the slots thereof, means for clamping said plate in such position, means for rotating said cylinder, means for trimming to a bevel its ends during such rotation, and means to automatically bring the cylinder to a state of rest as one revolution is completed, with its slots in alinement with the slots of the stationary cylinder, substantially as described.

23. In a machine of the character described, the combination of a stationary cylinder provided with longitudinal slots and with a hub, a bearing-standard, a stationary shaft mounted at its opposite ends in said hub and said standard, a rotatable cylinder of the same diameter as the stationary cylinder and suitably journaled to rotate around said shaft, and provided with longitudinal slots which register with the slots of the stationary cylinder, a pair of sprocket-wheels arranged in longitudinal alinement at each side of the stationary shaft and in the plane of said slots, endless chains connecting them, and push-arms projecting from said chains and adapted to project at first through the slots of the rotatable cylinder and, engaging the rear end of a stereotype-plate mounted upon said cylinder, slide the same forwardly upon and beyond the stationary cylinder, for the purpose set forth.

24. In a machine of the character described, the combination of a stationary cylinder provided with a hub, with longitudinal slots at opposite sides, and with an external groove at its rear end, a bearing-standard to the rear of said cylinder, a stationary shaft mounted in said bearing-standard and said hub, a rotatable cylinder journaled upon said shaft and at its front end in the groove of the stationary cylinder, and provided with longitudinal slots which register with the slots of the stationary cylinder when the rotatable cylinder is in a state of rest, a pair of sprocket-wheels in longitudinal alinement at each side of the shaft and in the plane of said slots, push-arms projecting from said chains and adapted to project through said slots and slide the stereotype-plate from its position upon the rotatable cylinder forwardly until it clears the front end of the stationary cylinder, substantially as described.

25. In a machine of the character described, the combination of a stationary cylinder slotted at opposite sides and in the same horizontal plane, a stationary shaft extending axially thereof and projecting to the rear, a cylinder mounted rotatably upon said shaft and of the same diameter as the stationary cylinder, and provided with longitudinal slots adapted, when in a state of rest, to register with the slots of the stationary cylinder, a pair of sprocket-wheels suitably journaled in longitudinal alinement and at opposite sides of said stationary shaft, sprocket-chains connecting the same and provided with push-arms, a rotating shaft, means for rotating the rotatable cylinder, and means actuated by the same, just previous to the completion of a revolution, to place said rotating shaft in gear with and operate said endless chain and thereby cause said push-arms to project through the slots of the rotatable cylinder (now in a state of rest), and, engaging the rear end of said stereotype-plate, push it forwardly beyond the front end of the said stationary cylinder, substantially as described.

26. In a machine of the character described, the combination of a stationary cylinder slotted at its opposite sides and in the same horizontal plane, a stationary shaft extending axially thereof and projecting to the rear, a cylinder mounted rotatably upon said shaft and of the same diameter as the stationary cylinder, and provided with longitudinal slots adapted, when in a state of rest, to register with the slots of the stationary cylinder, a pair of sprocket-wheels suitably journaled in alinement with and at opposite sides of said stationary shaft, sprocket-chains connecting the same and provided with push-arms, a rotating shaft, means for rotating the rotatable cylinder; means actuated by the same, just previous to the completion of a revolution to place said rotating shaft in gear with and operate said endless chain and thereby cause said push-arms to project through the slots of the rotatable cylinder (now in a state of rest), and means, actuated by one of said chains, to throw the same out of gear with said rotating shaft and bring them to a state of rest.

27. In a machine of the character described, the combination of a stationary cylinder slotted at opposite sides and in the same horizontal plane, a stationary shaft extending axially thereof and projecting to the rear, a cylinder mounted rotatably upon said shaft and of the same diameter as the stationary cylinder, and provided with longitudinal slots adapted when in a state of rest to register with the slots of the stationary cylinder, a pair of sprocket-wheels suitably journaled in longitudinal alinement at each side of said stationary shaft, sprocket-chains connecting each pair and provided with push-arms, a rotating shaft, means for rotating the rotatable cylinder, means actuated by the same just previous to the completion of a revolution to place said rotating shaft in gear with and operate said endless chains and thereby cause said push-arms to project through the slots of the rotatable cylinder (now in a state of rest), and a lever projecting into the path of one of said push-arms, and adapted, under the action of the latter, to bring the chains to a state of rest.

28. In a machine of the character described, the combination of a stationary cylinder longitudinally slotted, a standard, a shaft mounted rigidly in the same and in the cylinder, a cylinder journaled upon the stationary cylinder and said shaft, and of the same diameter as the former, a rotating shaft, a rotatable shaft, a clutch member loosely mounted upon the rotatable shaft and geared to the rotating shaft, a second clutch member mounted to slide upon and rotate with said rotatable shaft, a lever connected to slide the latter, but not to interfere with its rotation, and provided with a cam and projecting up into the stationary cylinder, sprocket-wheels journaled at opposite sides of the stationary shaft contiguous to the last-named lever and in the plane of the slots of the stationary cylinder, sprocket-wheels in longitudinal alinement with the same, near the front end and within the stationary cylinder, shafts journaled in said cylinder and carrying said sprocket-wheels, and geared to the said rotatable shaft, chains connecting each pair of alined sprocket-wheels, push-arms projecting horizontally therefrom, means for rotating said rotatable cylinder, a pin projecting from the same whereby, just before, its revolution is completed, the said cam is engaged and its lever operated to throw the rotating and rotatable shafts into gear and consequently to set said chains in operation, and a lever linked to the said cam-carrying lever and adapted to be engaged by one of the rearwardly-moving push-arms, whereby the latter are instrumental in throwing said shafts out of gear and bringing said chains to a state of rest, substantially as described.

29. In a machine of the character described, the combination of a rotatable cylinder, provided with annular grooves in its external surface, means to position a curved stereotype-plate upon said cylinder with reference to said grooves, means for rotating said cylinder, means for clamping said plate as such rotation begins and for releasing it as such rotation ends, and rotary knives or trimmers arranged to operate in such annular grooves and to trim the front end of the plate to a bevel and sever and trim it coincidently with the other or rearmost groove, substantially as described.

30. In a machine of the character described, the combination of a stationary cylinder, a cylinder of the same diameter abutting against its rear end, constructed to receive a stereotype-plate, a cylindrical frame of the same diameter and in advance of the stationary cylinder, and means to slide said stereotype-plate forwardly until it clears the front end of the stationary cylinder and rests entirely upon said cylindrical frame, substantially as described.

31. In a machine of the character described, the combination of a shaft suitably journaled, a cylindrical frame or carrier mounted rigidly upon said shaft, and adapted to receive a grooved stereotype-plate, a rotating shaft, instrumentalities for throwing said rotating shaft and the frame or carrier in gear, and instrumentalities at the end of a revolution and a half of said frame or carrier for throwing the latter out of gear with said shaft, substantially as described.

32. In a machine of the character described, the combination of a shaft suitably journaled, a cylindrical frame or carrier mounted upon said shaft and adapted to receive a stereotype-plate, a segmental shaving-box vertically below, concentrically of and of slightly-greater diameter than said frame or carrier, a rotating shaft, instrumentalities for throwing the same in gear with the frame or carrier to permit the latter in one half-revolution to deposit the stereotype-plate within the shaving-box, a knife upon the frame or carrier, which shaves or trims the concave surface of the stereotype-plate during the second half-revolution of the frame or carrier, a block for engaging the rear end of the stereotype-plate (with respect to its rotatable action or direction of travel) to push it upwardly out of the shaving-box during the third half-revolution of the frame or carrier, and means, actuated by the rotatable movement of the carrier for throwing it out of gear as it completes such third half-revolution, with said rotating shaft, substantially as described.

33. In a machine of the character described, the combination of a rotatable shaft, a frame or carrier mounted thereon, and adapted to receive a curved stereotype-plate, a shaving-box of segmental form arranged concentrically with, of slightly-greater diameter than and below said carrier, a sliding block projected from said carrier at the lower and rear end (with respect to the movement of the carrier), and means for rotating said carrier and depositing said plate in the shaving-box.

34. In a machine of the character described, the combination of a rotatable shaft, a rotary frame or carrier thereon, a segmental shaving-box arranged concentrically of, of slightly-greater diameter than, and below said carrier, means on the carrier for placing a curved stereotype-plate within said box and adjacent to the periphery of the segmental carrier, a slide-plate, and means for adjusting the same into the advance path of said stereotype-plate, substantially as described.

35. In a machine of the character described, the combination of a rotatable shaft, a rotary frame or carrier thereon, a segmental shaving-box arranged concentrically of, of slightly-greater diameter than, and below said carrier, means on the carrier for placing a curved stereotype-plate within said box and adjacent to the periphery of the segmental carrier, a stop-plate, means for adjusting the same into the advance path of said stereotype-plate, and a knife mounted upon the carrier and adapted to shave the concave surface of said plate, substantially as described.

36. In a machine of the character described, the combination of a rotatable shaft, a rotary frame or carrier thereon, a segmental shaving-box arranged concentrically of, of slightly-greater diameter than, and below said carrier, means on the carrier for placing a curved stereotype-plate within said box and adjacent to the periphery of the segmental carrier, a stop-plate, means for adjusting the same into the advance path of said stereotype-plate, a knife mounted upon the carrier and adapted to shave the concave surface of said plate, and means for moving said stop-plate out of the path of said stereotype-plate immediately the knife has passed, substantially as described.

37. In a machine of the character described, the combination of a rotatable shaft, a frame or carrier thereon, a segmental shaving-box arranged concentrically of, of slightly-greater diameter than, and below said carrier, that it may receive snugly a curved stereotype-plate, a sliding block upon the carrier, and means actuated by the latter to advance said sliding block and cause it to engage the rear end of and push the stereotype-plate up and out of the shaving-box and upon the carrier, substantially as described.

38. In a machine of the character described, the combination of a rotatable shaft, a rotary frame or carrier thereon, a segmental shaving-box arranged concentrically of, of slightly-greater diameter than, and below said carrier, means on the carrier for placing a curved stereotype-plate within said box and adjacent to the periphery of the segmental carrier, a stop-plate, means for adjusting the same into the advance path of said stereotype-plate, a knife mounted upon the carrier and adapted to shave the concave surface of said plate, means for moving said stop-plate out of the path of said stereotype-plate immediately the knife has passed, and means for projecting a sliding block outwardly to cause it to engage the rear end of the stereotype-plate and push it up and out of the shaving-box and upon the rotary carrier, substantially as described.

39. In a machine of the character described, the combination of a rotatable shaft, a circular frame or carrier mounted thereon, a segmental shaving-box arranged concentrically of, vertically below, and of greater diameter than said carrier, pins projecting from the carrier at diametrically opposite points, adjustable knives in advance of said pins, adjustable blocks in advance of said knives (with respect to the direction of rotation), registering grooves in the ends of said carrier, said knives and said blocks, a sliding stop-plate at one side of the shaving-box, levers pivotally linked to said plate and provided with inwardly-projecting studs, rotatable shafts, eccentrics thereon, pivotally connected also to said stop-plate, and a triangular cam upon one of said shafts, adapted to be operated one step by a pin with each half-revolution of the carrier and thereby adjust said stop-plate and said sliding blocks, substantially as and for the purpose set forth.

40. In a machine of the character described the combination of a rotatable shaft, a circular frame or carrier mounted thereon, a segmental shaving-box arranged concentrically of, vertically below and of greater diameter, than said carrier, pins projecting from the carrier at diametrically opposite points, adjustable knives in advance of said pins, adjustable blocks in advance of said knives (with respect to their direction of rotation), registering grooves in the ends of said arms, said knives and said blocks, a sliding stop-plate at one side of the shaving-box, levers pivotally linked to said plate and provided with inwardly-projecting studs, rotatable shafts, eccentrics thereon, pivotally connected also to said stop-plate, a triangular cam upon one of said shafts, a cam upon one of the shafts, a rotating shaft, a clutch member mounted loosely thereon and geared to the rotatable shaft of the carrier, a second clutch member mounted to slide upon and rotate with said shaft, and a lever connected to slide said clutch member without interfering with its rotatable action, and provided with a pin which is engaged by the last-mentioned cam once in each revolution and a half of the carrier, so as to throw said clutch members out of gear and bring the carrier to a state of rest, substantially as described.

41. In a machine of the character described, the combination of a rotary carrier, a shaving-box below, a stop-plate thereon, and instrumentalities operated by the rotating carrier for reciprocating the stop-plate, substantially as described.

42. In a machine of the character described, the combination of a shaving-box to receive curved stereotype-plates, a rotary carrier therein, reciprocatory blocks mounted on the carrier, and instrumentalities actuated by the rotary carrier for adjusting the said blocks inward or outward with relation to the axis of the carrier, substantially as described.

43. In a machine of the character described, the combination of a shaving-box to receive a curved stereotype-plate, a carrier rotating therein, knives upon said carrier, blocks also upon the carrier, and instrumentalities actuated by the rotating carrier, for adjusting one of said blocks inward and exposing the corresponding knife to permit it to engage and shave said stereotype-plate, substantially as described.

44. In a machine of the character described, the combination of a shaving-box, a carrier rotating therein, blocks upon the carrier, a sliding stop-plate upon the shaving-box, and instrumentalities actuated by the rotating carrier for moving the stop-plate out of the path of a curved stereotype-plate in the shaving-box, and for advancing or adjusting outwardly the block of the carrier to the rear of said stereotype-plate, with respect to the motion of the carrier, substantially as described.

45. In a machine of the character described, the combination of a rotating shaft, a rotating carrier in gear therewith, a shaft provided with a pair of cams, one of them triangular in form, pins projecting from said carrier and successively engaging said triangular cam and rotating the cam-shaft with a step-like movement, and instrumentalities, as the cam-shaft completes one revolution, which are actuated by the other cam and throw the rotating carrier out of gear, substantially as described.

In testimony whereof I affix my signature in the presence of two witnesses.

CHARLES T. MURRAY.

Witnesses:
G. Y. THORPE,
M. R. REMLEY.